United States Patent [19]

Baack et al.

[11] 4,242,468

[45] Dec. 30, 1980

[54] USE OF MONOHYDROXYLATED POLYBUTADIENE AS A REACTIVE PLASTICIZER IN POLYURETHANES

[75] Inventors: Michael Baack; Artur Bartkowiak; Juergen Neuroth, all of Frankfurt am Main, Fed. Rep. of Germany

[73] Assignee: Revertex Limited, United Kingdom

[21] Appl. No.: 69,237

[22] Filed: Aug. 23, 1979

[30] Foreign Application Priority Data

Aug. 24, 1978 [DE] Fed. Rep. of Germany ....... 2836986

[51] Int. Cl.$^3$ .............................................. C08G 18/62
[52] U.S. Cl. ...................................... 521/170; 528/49
[58] Field of Search .......................... 521/170; 528/49

[56] References Cited

U.S. PATENT DOCUMENTS

| 3,674,743 | 7/1972 | Verdol et al. | 521/170 |
|---|---|---|---|
| 4,021,383 | 5/1977 | Cuscurida et al. | 521/170 |
| 4,133,723 | 1/1979 | Howard | 528/49 |
| 4,174,307 | 11/1979 | Rowe | 528/49 |

*Primary Examiner*—Maurice J. Welsh
*Attorney, Agent, or Firm*—James & Franklin

[57] ABSTRACT

The use is described of monohydroxy-terminated polybutadienes as reactive or internal plasticizers for polyurethanes. The polyurethanes are made in conventional manner by reacting at least one polyisocyanate with at least one polyol under polyurethane-forming conditions, which may include the presence of a catalyst. In accordance with the invention this reaction is carried out in the presence of a monohydroxy-terminated polybutadiene which may have a molecular weight of 500 to 100,000, preferably 900 to 20,000. As a monohydroxy-terminated polybutadiene is a constituent of the resulting polyurethane, the use of a polybutadiene diol as the polyol is excluded. Short chain polyols and conventional additives may be present and the resulting polyurethane may be in the form of a solid or a foam.

8 Claims, No Drawings

USE OF MONOHYDROXYLATED POLYBUTADIENE AS A REACTIVE PLASTICIZER IN POLYURETHANES

BACKGROUND OF THE INVENTION

This invention relates to polyurethanes and is particularly concerned with the use of a monohydroxylated polybutadiene as a reactive plasticiser in the preparation of polyurethanes from polyisocyanates and polyols.

Polyurethanes may be prepared from polyisocyanates and polyols, for example diols such as polyether diols, polyester diols and polytetramethylene glycols. These hydroxy-terminated compounds serve to extend the chain, and possess at least two hydroxyl groups per molecule. Polyurethanes are usually plasticised by means of plasticisers whereby a softening of the polymer is brought about (U.S. Pat. No. 3,427,366).

Plasticisers such as phthalates and organic phosphates cannot be durably incorporated into the polymer structure; hence they function as so-called external plasticisers. Generally several plasticisers are compounded together with a polyurethane in order to secure the desired advantages with respect to the properties of the polymer. External plasticisers can, however, migrate to the surface of the polymer, depending upon the chemical composition of the polymer and under the influence of the ambient conditions. It has been proposed to prevent this migration of plasticiser by internal plasticisation of the polymer and to build polymerisable plasticisers into the polymer molecule.

It is an object of the invention to provide a polyurethane composition which is internally plasticised so that the problems associated with migration of plasticiser are reduced or obviated.

SUMMARY OF THE INVENTION

According to one aspect of the present invention there is provided the use of a monohydroxy-terminated polybutadiene as a reactive plasticiser in the preparation of a polyurethane by the reaction of one or more polyisocyanates and one or more polyols other than polybutadiene diols.

Another aspect of the present invention provides a process for the preparation of a polyurethane, wherein at least one polyisocyanate is reacted with at least one polyol other than a polybutadiene diol in the presence of a monohydroxy-terminated polybutadiene to form a polyurethane.

DETAILED DESCRIPTION OF THE PREFERRED EMBODIMENTS

The polyols which may be used in accordance with the present invention to prepare the polyurethanes are preferably compounds having from 2 to 8, preferably 2 to 4 hydroxyl groups, and include, for example, polyesters, polyethers, polythioethers, polyacetals, polycarbonates and polyesteramides which have 2 to 8 hydroxyl groups, such as are known for the preparation of homogeneous and cellular polyurethanes. Polybutadiene diols are excluded, however, and the use of a monohydroxy-terminated polybutadiene is accordingly not claimed as a plasticiser in those polyurethanes which are formed from polyisocyanates and polybutadiene diols. Particularly preferred diol constituents for polyurethanes are liquid polydiols having a molecular weight of from 2,000 to 4,000. In addition, short chain polyols with two to three hydroxyl groups may also be incorporated, such as diethylene glycol.

The monohydroxy-terminate polybutadienes which may be used in accordance with the present invention are liquid polybutadienes which have one hydroxyl group per molecule and have a molecular weight of from 500 to 100,000. Preferably the molecular weight of the monohydroxylated liquid polybutadiene is from 900 to 20,000. A suitable liquid polybutadiene with one terminal hydroxyl group and with an average molecular weight of about 5,000 has a viscosity of 3.7 Pa.sec.

In the polyurethane-forming reaction of one or more polyisocyanates with one or more polyols etc., using a monohydroxyterminated liquid polybutadiene as a constituent in accordance with the invention, the monofunctional polybutadiene is linked at one end to the polyurethane molecule via an isocyanate group.

Suitable isocyanate components for forming plasticised polyurethanes using monohydroxy-terminated liquid polybutadiene in accordance with the invention include the ordinary aliphatic, cycloaliphatic or aromatic isocyanates with two or more isocyanate groups, such as 1,4-tetramethylenediisocyanate, diphenylmethane diisocyanate, cyclohexane-1,3-diisocyanate and polymethylenepolyphenylene polyisocyanate.

The following procedures can be employed for the preparation of plasticised or softened polyurethane polymers using the monohydroxy-terminated polybutadiene in accordance with the invention.

A conventional isocyanate for use in the preparation of a polyurethane, such as diphenylmethane diisocyanate, is mixed at room temperature with the conventional long chain liquid polydiols, and any short chain diols, such as ethylene glycol, together with the monohydroxy-terminated liquid polybutadiene which is to be used. The reaction can be accelerated by the inclusion of conventional polyurethane-forming catalysts, such as tertiary amines or organo-metallic compounds, and a better cure is thereby effected. If required, additives such as fillers, pigments, emulsifiers or blowing agents may be added to the mixture, according to the end-use. The end-products may be in the form of solid homogeneous products or of foams.

The invention is illustrated in more detail in the following Examples, in which all parts are parts by weight unless otherwise indicated.

EXAMPLE 1

A polyurethane elastomer was produced from the following polyol ingredients and a polyisocyanate, the polyol ingredients comprising a mixture of

| | | |
|---|---|---|
| Polyether diol, with an average molecular weight of 450 | 100 | parts |
| Polyether diol, with an average molecular weight of 2,800 | 70 | parts |
| Polyether triol, with an average molecular weight of 6,500 | 30 | parts |
| Butane diol-1,4 | 20 | parts |

The mixture was thoroughly stirred, de-gassed under reduced pressure and reacted with 100 parts of carbodiimide-modified 4,4'-diphenylmethane diisocyanate, employing dibutyltin dilaurate as catalyst, and poured on to a flat plate. The polyurethane elastomer thus obtained had the following physical properties:

| Tensile Strength | 37 mPa. |
| --- | --- |
| Elongation at Break | 760 % |
| Hardness (Shore A) | 60-55 |

EXAMPLE 2

To the reaction mix described in Example 1 were added 30 parts of one of the following plasticisers.
 (a) Dioctyl phthalate (DOP)
 (b) A monofunctional polybutadiene with terminal hydroxyl group, 0.22% OH, molecular weight about 5,000.

When the internal plasticiser (b) was used, the isocyanate component was increased further, equivalent to the OH-content. The following data were obtained:

| | (a) | (b) |
| --- | --- | --- |
| Tensile Strength | 7.0 mPa. | 12.8 mPa. |
| Elongation at break | 740% | 580% |
| Loss in weight, after 24 hours at 100° C. | 0.7% | 0.2% |
| Hardness (Shore A) | 42-46 | 52-58 |
| Exudation at room temperature | — | — |

EXAMPLE 3

To the reaction mix described in Example 1 were added 105 parts of one of the following plasticisers:
 (a) Dioctyl phthalate (DOP)
 (b) A monofunctional polybutadiene with terminal hydroxyl group, 0.22% OH, molecular weight about 5,000.

When the internal plasticiser (b) was used, the isocyanate component was increased further, equivalent to the OH-content. The following data were obtained:

| | (a) | (b) |
| --- | --- | --- |
| Tensile Strength | 2.4 mPa. | 5.1 mPa. |
| Elongation at break | 570% | 550% |
| Loss in weight, after 24 hours at 100° C. | 1.1% | 0.01% |
| Hardness (Shore A) | 30-35 | 33-40 |
| Exudation at room temperature | — | — |

EXAMPLE 4

A polyurethane elastomer of the following composition was prepared in an analogous manner to that described in Example 1.

| Polyether diol, with molecular weight of 2,000 | 75 parts |
| --- | --- |
| Polyether triol, with molecular weight of 4,500 | 75 parts |
| Carbodiimide-modified 4,4'-diphenylmethane diisocyanate | 19 parts |

The mixture was reacted with the addition of 0.03 parts dibutyl tin dilaurate as catalyst and poured on to a flat plate. The following physical data were obtained:

| Tensile Strength | 1.04 mPa. |
| --- | --- |
| Elongation at break | 480% |
| Hardness (Shore A) | 18-20 |

EXAMPLE 5

To the reaction mix described in Example 4 were added 50 parts of one of the following plasticisers:
 (a) Dioctyl phthalate (DOP)
 (b) A monofunctional polybutadiene with terminal hydroxy group, 0.22% OH, molecular weight about 5,000.

When the internal plasticiser (b) was used, the isocyanate component was increased further equivalent to the OH-content. The following data were obtained:

| | (a) | (b) |
| --- | --- | --- |
| Tensile Strength | 0.57 mPa. | 0.63 mPa. |
| Elongation at break | 490% | 660% |
| Loss in weight, after 24 hours at 100° C. | not measured | 0.04% |
| Hardness (Shore A) | 11-9 | 8-6 |
| Exudation at room temperature | — | — |

EXAMPLE 6

A polyurethane elastomer of the following composition was prepared:

| Polyether diol, with molecular weight of 450 | 50 | parts |
| --- | --- | --- |
| Polyether triol, with molecular weight of 4,500 | 50 | parts |
| Polymethylenepolyphenylene-polyisocyanate (crude MDI) with 30.4% isocyanate content | 60 | parts |
| Dibutyl tin dilaurate | 0.03 | parts |

The following physical data were obtained:

| Tensile Strength | 3.3 mPa. |
| --- | --- |
| Elongation at break | 225% |
| Hardness (Shore A) | 48-52 |

EXAMPLE 7

To the reaction mix described in Example 6 were added 75 parts of one of the following plasticisers:
 (a) Dioctyl phthalate (DOP)
 (b) A monofunctional polybutadiene with terminal hydroxyl group, 0.22% OH, molecular weight about 5,000.

When the internal plasticiser (b) was used, the isocyanate component was increased further equivalent to the OH-content. The following data were obtained:
 (a) A smooth and unblemished film of elastomer was not formed.

| (b) | Tensile strength | 1.6 mPa. |
| --- | --- | --- |
| | Elongation at break | 210% |
| | Hardness (Shore A) | 40-42 |
| | Loss in weight, after 24 hours at 100° C. | 0.01% |
| | Exudation at room temperature | — |

The Examples show that all the plasticisers employed depress the hardness of the polymer, although to a different extent. Conditioning experiments at 100° C. showed, however, that after 24 hours 0.7 to 1% of the plasticiser has been volatilised. Under critical conditions, the fear of migration may therefore become real. In the case of polyurethane elastomers containing monohydroxylated polybutadiene softer products are invariably obtained, out of which, nevertheless, the added internal plasticiser (monohydroxylated polybutadiene) does not migrate. The loss in weight determined is insignificant. It may be assumed accordingly, that the monohydroxylated polybutadiene is built into the polymer structure and at the same time is effective as a plasticiser by reason of the long free chain.

We claim:

1. A process for the preparation of a polyurethane, comprising the step of reacting, under polyurethane-forming conditions,
    (A) at least one polyisocyanate,
    (B) at least one polyol selected from the group consisting of polyesters, polyethers, polythioethers, polyacetals, polycarbonates, polyesteramides, polyalkylene diols, and diols of polyalkadienes of which the alkadiene moiety has the formula $C_nH_{2n-4}$ wherein n is an integer selected from 3 and above 4, and
    (C) a monohydroxy-terminated polybutadiene having a molecular weight of 500 to 100,000 as an internal plasticiser for the polyurethane.

2. The process of claim 1, wherein the monohydroxy-terminated polybutadiene has a molecular weight of 900 to 20,000.

3. The process of claim 1, wherein the polyol has 2 to 8 hydroxyl groups.

4. The process of claim 1, wherein the polyol has 2 to 4 hydroxyl groups.

5. The process of claim 1, wherein a polyurethaneforming catalyst is also present.

6. The process of claim 1, wherein the polyisocyanate is selected from the group consisting of aliphatic, cycloaliphatic and aromatic isocyanates having at least two isocyanate groups.

7. The process of claim 1, wherein the resulting polyurethane is in the form of a solid.

8. The process of claim 1, wherein the resulting polyurethane is in the form of a foam.

* * * * *